T. BOLDIZZONI & P. BOSIO.
MUSIC LEAF TURNER.
APPLICATION FILED JULY 16, 1914.

1,150,740.

Patented Aug. 17, 1915.
4 SHEETS—SHEET 1.

WITNESSES
H. D. Walker
J. Edwin Burch

INVENTORS
Teobaldo Boldizzoni.
Peter Bosio.
BY
ATTORNEYS

T. BOLDIZZONI & P. BOSIO.
MUSIC LEAF TURNER.
APPLICATION FILED JULY 16, 1914.

1,150,740.

Patented Aug. 17, 1915.
4 SHEETS—SHEET 2.

WITNESSES
H. J. Walker
Edwin Burch

INVENTORS
Teobaldo Boldizzoni
Peter Bosio.
BY Munn & Co
ATTORNEYS

UNITED STATES PATENT OFFICE.

TEOBALDO BOLDIZZONI AND PETER BOSIO, OF NEW YORK, N. Y., ASSIGNORS, BY DIRECT AND MESNE ASSIGNMENTS, OF ONE-THIRD TO SAID BOSIO AND ONE-THIRD TO FRANK CORINO, OF WEST HOBOKEN, NEW JERSEY, AND ONE-THIRD TO EDWARDS PREVOSTO AND BAPTIST GIONOTTI, BOTH OF NEW YORK, N. Y.

MUSIC-LEAF TURNER.

1,150,740.  Specification of Letters Patent.  Patented Aug. 17, 1915.

Application filed July 16, 1914. Serial No. 851,341.

*To all whom it may concern:*

Be it known that we, TEOBALDO BOLDIZZONI, a subject of the King of Italy, and PETER BOSIO, a citizen of the United States, both residents of the city of New York, borough of Manhattan, in the county and State of New York, have invented a new and Improved Music-Leaf Turner, of which the following is a full, clear, and exact description.

Our invention has particular reference to improvements in leaf turning devices for folios, books and the like and more particularly to those commonly termed music leaf turners.

The primary object of the invention is comprehended in the provision of a simple and novel device of the above character which is more particularly an improvement upon the structure illustrated in Patent No. 1,087,712, dated February 17, 1914, in that different and more positively actuating means for turning the leaf engaging arm are provided, which, instead of necessitating pull in a horizontal direction tending to swing the leaf-turning arm, exerts pull vertically so as to particularly adapt the device for musicians' stands or tripods so that the working parts can be substantially hidden from view.

A further object of the invention is to provide a music leaf turner having novel means or mechanism operated by a pull wire at the depression of a treadle to cause the engagement of the leaf-turning arm with a music sheet to be turned and then released, or turned to its original position without releasing the leaf, as when it is desired to repeat or re-read the matter appearing on a sheet, as well as to adapt the device for books or folios of different thicknesses by permitting the operation of the arm at different angular positions at either side when met with the proper resistance.

A further object of the invention is to provide novel means for attachment to the leaves or sheets for engagement by a turning arm also of novel construction, whereby the turning of the leaves is made positive, while the mechanism carrying the arm is adapted to support a music rack which, together with the mechanism and arm, can be compactly folded so as to occupy a minimum space to be conveniently carried in a receptacle when transported from place to place.

With the above and other objects in view, the invention resides in the peculiar combination and arrangement of parts to be hereinafter more fully described, illustrated and claimed, it being also an object to provide a device which is simple in construction, durable and efficient in operation and not likely to get out of working order.

Reference is to be had to the accompanying drawings forming a part of this specification, in which similar characters of reference indicate corresponding parts in all the views, and in which—

Fig. 8 is a front elevation of the rack in folded position with a portion thereof broken away; Fig. 13 is a plan view of the blank from which the clips are made.

As illustrated in the drawings, the leaf-turning mechanism A is adapted for turning the leaves of a music book or folio B, although it is here explained that leaves of any book may be turned as when supported in a convenient position to be read. In the present invention reference is more especially made to a device adapted for application to musicians' stands or tripods, an illustration of which is shown at C. The tripod in the present instance is shown as comprising a plurality of legs 10 pivoted to a plurality of spaced ears 11 of a bracket member 12 which slidably receives the lower section 13 of a standard having a flange or enlargement 14 at its lower end adapted for engagement by a spring catch 15 carried by the bracket member in order to hold the standard in a vertically extended position when engaged beneath the flange or enlargement.

A section 16 is slidable in the section 13 of the standard and is adapted to be held in vertically adjusted position by frictional engagement of a set screw 17 with its peripheral face, said set screw operating through the upper end of the section 13 and having threaded engagement therewith. The upper end of the section 16 of the standard is provided with a flange 18 extending about half way around its circumference, thus providing a depression 19 at the opposite side so that the ends of the flange will form shoulders to limit the turning movement of the casing of the mechanism when adjusted angularly in the section. For this purpose the casing, which is indicated by the numeral 20, carries a sleeve 21 on its rear face to extend down into the standard and to turn therein so that when the sleeve is vertically disposed in the standard the casing and the mechanism contained therein will be supported in angular relation to the standard and inclined rearwardly with the upper end of the sleeve open and of reduced diameter. The leaf-turning mechanism A, as above mentioned, includes the casing 20 which is vertically elongated, and further comprises a turning arm 22 which is turned by a mechanism contained in the casing so as to cause the arm to engage the leaves through the instrumentality of engaging means or clips carried thereby, as will be hereinafter more fully described, and to turn them singly and successively.

Figure 12:
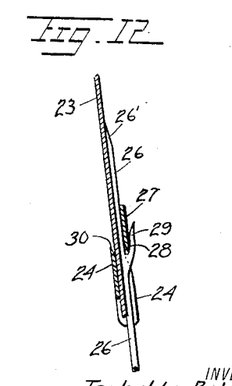
Fig. 12 is a vertical sectional view of a leaf carrying an improved engaging member or clip with the leaf-turning arm engaged therewith.

To adapt the book or folio for engagement by the turning arm each leaf 23 is provided at its lower edge with an engaging member or clip 24, each comprising a rectangular blank section of sheet material, such as celluloid or the like, which is capable of being bent and pressed or retained in this condition. Each blank is provided with a rectangular aperture 25 so that when the blank is bent in the manner shown in Fig. 12 of the drawings and applied to the bottom edge of a leaf so that the latter will be engaged between the front and rear portions of the clip, the front portion of the blank will extend above the rear portion so as to provide a pocket by means of the opening to be engaged by the curved free extremity 26 of the leaf-turning arm which is curved inwardly, as shown at 26', to render the engagement more positive, in conjunction with the beveling of the bottom edge of the connecting portion 27 of the clip, as shown at 28. The turning arm is provided with a finger 29 which is spaced from the main portion thereof and which terminates short of its free end, said finger being curved outwardly in an opposite direction to the curvature of the portion 26, as shown, so as to engage outwardly of the connecting portion 27 and substantially grasp the same in the selfsame manner as if caught hold of by two fingers. The edge of the clip which engages rearwardly of the leaf is beveled as shown at 30 so as to freely receive the leaf between the folded parts, while the pressure exerted by the latter against the opposite faces of the leaf will retain the clip thereon.

The turning arm is pivotally connected at its inner end, as shown at 31, to the stem portion 32 of a vertically disposed spiral member 33 so as to have vertical swinging movement on said pivot in engaging and disengaging the leaves. The arm for this purpose is bifurcated at its inner end and straddles the stem portion as well as a ring 34 which is in turn slidably mounted on the stem through the medium of an apertured upper portion 35 and a grooved collar 36 at its lower end, while the arm is provided with opposed longitudinal slots 37 receiving a cross pin 38 projecting in opposite directions from the ring to cause vertical swinging movement of the arm on the pivot 31 as the ring is raised and lowered. For this purpose a horizontally disposed presser foot 39 is slotted to engage the grooved collar 36, said presser foot being carried at the lower end of a bar 40 which is vertically slidable through the bottom wall 41 of the casing.

Mounted on the bar which also extends through the upper wall 42 of the casing is a block or stop member 43, the same being disposed about midway of the height of the bar and having or carrying a forwardly projecting pin 44, while a coiled spring 45 is mounted on the bar between the bottom wall of the casing and the block to normally elevate the bar and the presser foot, which is in turn provided with an enlargement 46 producing a shoulder limiting the upward displacement of the pressure foot by engagement with a depending plate 47 carried by the bottom wall of the casing. Also vertically slidable in the casing to one side of and parallel relation to the bar 40, is a rod 48 which, at its lower end is provided with a foot piece 49 provided with a thread or aperture conforming to the cross section of the spiral so as to operate as a nut when depressed to cause the rotation of the latter together with the turning arm carried thereby. The rod likewise operates through the top and bottom portions of the casing and is retained with its foot portion upwardly displaced on the spiral by means of a coiled spring 50 which surrounds the rod between its bottom wall and a collar or strap member 51 fixed to the rod.

In the casing at the opposite side of the bar 40 with respect to the position of the rod 48 is a plunger 52, the same being slidable through the bottom of the casing and carrying a cross head 53 at its upper end which is apertured to slidably receive the bar and rod aforesaid. This cross head and the plunger are retained in an upward position by means of a spring 54 mounted on the rod between the bottom of the casing and the cross head, while the cross head is in turn provided with a forwardly projecting engaging pin 55. Pivoted in the lower portion of the casing near one side or at its lower right hand corner, in Fig. 4 as by means of a plate 56 having opposed extensions 57 disposed in opposite recesses in the sides of the casing, is a lever 58, the same being pivoted as shown at 59 to swing laterally and being normally held to exert pressure in one direction laterally or toward the right in Fig. 4, as by means of a V-spring 60 with its spiral portion anchored to a stud 61 on the plate 56 and having one arm engaging the left hand side of the casing and the other arm disposed between a pair of projections 62 of the lever. The arm about midway of its height and at its right hand edge is provided with a pair of recesses producing a square shoulder 63 and a rounded shoulder 64 there-beneath and located toward the left with respect thereto, while the edge of the lever there-above is curved to provide a camming edge 65 adapted for coöperation with the pin 55 in disengaging the pin 44 from beneath the shoulder 64. Pivoted to the lever 58 near its upper end is a pawl 66 having a curved edge 67 continuing from an extension 68 which serves, by engagement with the left hand wall of the casing, to limit the swinging of the lever and pawl to the left, while a projection 69 carried by the lever beneath the pawl serves to support the pawl and limit its downward movement.

The front of the casing is indicated by the numeral 70 and is removably secured thereto so as to bear upon the forwardly projecting bottom wall of the casing, and said front portion is provided with wedge-shaped side flanges 71 near its lower end and tapering downwardly, while between said flanges a pair of headed studs 72 are provided projecting beyond the edge portions of the flanges. The purpose of this construction is to adapt the casing to support a music rack D and for this purpose said rack is made up of an angular ledge or supporting part 73 provided with a pair of vertically alined bayonet slots 74 intermediately of its transverse center to engage the studs which are passed through the enlarged portions of the slots and the rack afterward retained in position by pressing downward thereon to exert friction between the flanges and the inner faces of the heads of the studs against the angular portion 73. The ledge of the angular portion 73 of the rack is provided with a pair of curved notches or recesses 75 and 76 at opposite sides of the casing and concentric to the pivot of the arm so as to receive the latter when in its different positions while turning the leaves.

Figure 1:
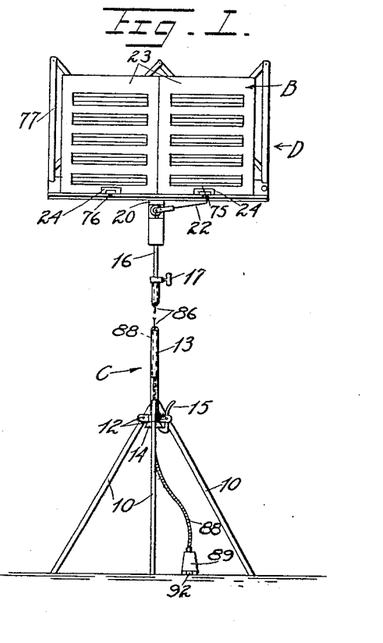
Figure 1 is a front elevation of a musician's stand or tripod equipped with the improved music leaf turner and accouterments which are coöperative therewith.

The back of the rack comprises a folding or knock-down structure consisting of end links 77 and pivotally connected cross links 78 and 79, the upper ends of the links 77 being connected to the upper ends of the links 78 which are in turn pivotally connected at their lower ends, while the links 79 which cross the links 78 are pivoted thereto, as shown at 80, and pivotally connected to each other at their upper ends. The links 79 have their lower ends bent at an angle, one link being pivotally connected to an angular portion of the rack, as shown at 81, while the other side is engageable by means of a stud 82 with a slot 83 of said angular portion, and the end links 77 are provided with pivoted sleeves 84 slidably engaging with the links 79 so that by disengaging the stud 82 from the slot 83 the parts may be collapsed in the manner of lazy tongs and folded behind the angular portion of the rack, as is clearly shown in Fig. 8 of the drawings. In this manner when the music book or folio is supported on the ledge of the rack in the manner shown in Fig. 1 of the drawings the leaves at either side of the casing provided with the engaging members or clips at their lower edges will be positioned adjacent to the notches or recesses 75 and 76.

Projecting rearwardly from the cross head 53 is a vertically slotted extension 85 adapted for engagement by the upper end of a pull wire 86 which is provided with an enlargement 87 at said end and which depends therefrom to extend through the telescoping sleeve 21 and then through the telescoping sections of the standard and thence through a flexible casing or tube 88. This flexible casing or tube 88 is fixed to the lower end of the upper or extensible section of the standard of the tripod and at its free end is connected to the stationary part of a suitable pull mechanism for operating the mechanism by depressing the cross head 53. This mechanism in the present instance is adapted to be operated by one foot of the player and comprises a treadle 89 pivoted to one end of a base 90 and normally held in a raised position by a spring 91 carried by the pivot 92 connecting these parts and exerting opposite tension against the base and the treadle or depressible member of the pull mechanism. A curved standard 93 is pivoted to the other end of the base, as shown at 94, the base being supported upon pads 95 at said end, whereby the latter is spaced from the floor or support to accommodate the engaging end of a spring catch 96 which is fixed to the standard and engages beneath the base to hold the standard in an upright position. The flexible casing or tube 88 is attached to the free end of the standard, and the wire or cable 86 at this end is provided with an enlargement 97 so that the wire can be removably engaged with a notch 98 in the free end of the treadle with the enlargement preventing displacement thereof and serving, when the treadle is depressed, to exert pull on the wire.

Figures 1B, 3, 4:
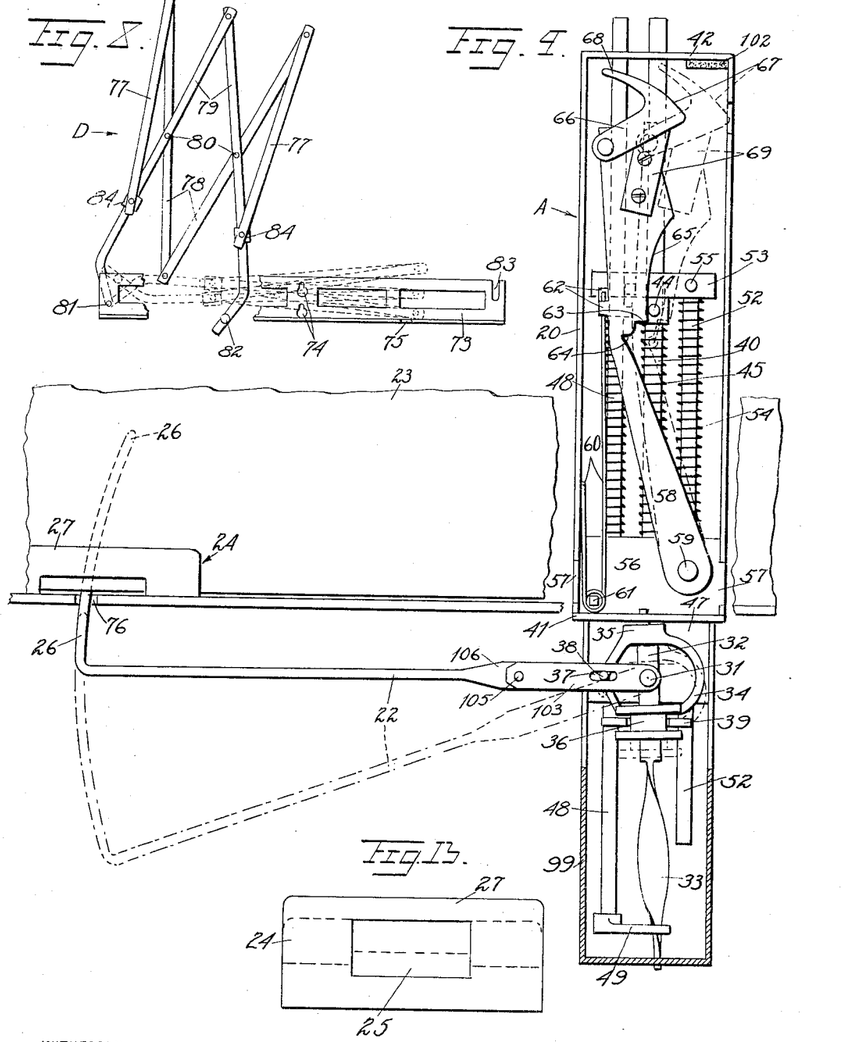
Fig. 3 is a sectional view taken on the line 3—3 of Fig. 2 with the front of the casing of the turning mechanism removed and showing the turning arm in its initial or natal position.
Fig. 4 is a view similar to Fig. 3 but showing the turning arm in the position after having turned a leaf.

In the operation of the device the parts may be assumed to be in the position shown in solid lines in Fig. 3 of the drawings, when the cross head 53 is upwardly displaced together with the plunger 52 under the action of the coiled spring 54 as well as the rod 48 under the action of its spring 50. The bar is shown slightly depressed so that the pin 44 will engage beneath the shoulder 63, the bar being held in this position due to the lever 58 being constantly held in engagement therewith by the spring 60 so that the ring 34 which is engaged by the presser foot 39 will be held downwardly and thereby hold the turning arm in a downwardly inclined position by reason of the connection of the ring with the inner end of the arm. During this movement the oppositely projecting pin 38 will move in the slots 37, and as the arm is held from rotation independent of the stem 32 of the spiral and therefore of the spiral also, the ring or shiftable member carried by the stem and serving to move the arm vertically when the bar is depressed or permitted to elevate under the action of its spring, is allowed to translate only up and down. The spiral is journaled at its lower end in the bottom wall of an auxiliary casing 99 and at its upper end through the bottom wall 41 of the casing 20, the casing having its upper portion cut away adjacent to the ring to allow horizontal swinging movement of the turning arm and having a vertical rear extension 100 carried by or secured to the casing 20 as shown at 101. Upon the treadle being depressed pull is exerted upon the wire 86 to cause the cross head 53 to move downwardly, whereby the pin or projection 55 will engage the curved edge of the pawl 66, as shown in dotted lines in Fig. 3, so as to swing the lever 58 on its pivot to the left against the action of the spring 60 while the projection 69 prevents downward movement of the pawl. In this manner the pin 44 is released from beneath the shoulder 63 and the bar, under the action of its spring 45, will be raised or elevated as shown in dotted lines in Fig. 3, against the camming edge 65, and as the presser foot moves with the bar it will elevate the ring with which it is engaged through the medium of the grooved collar 36, and the engaging portion of the turning arm, which extends upwardly and which is normally disposed against the leaf or music sheet slightly above its lower edge, as shown in full lines in Fig. 3, will be raised to the dotted line position, so as to pass beneath the connecting portions 27 of the clip and between this portion and the music sheet, while the pinion 29 engages outwardly thereof, as is more clearly shown in Fig. 12 of the drawings. Further depression of the treadle will cause the cross head, which is moved in contact with the collar 51, to depress the rod 48 against the action of its spring and in so doing the foot piece 49 will be depressed and moved over the spiral 33 to rotate the turning arm to the left in the same horizontal plane so as to carry the leaf therewith, whereby the latter, due to the inclination given to the rack, will be partly turned by its inertia after moving over the central position. The cross head is now in contact with the collar 51 and the block 43 at the upper end of the bar, and as the treadle is depressed farther to exert further pull upon the wire the bar is depressed, together with its presser foot, to move the arm downwardly from the full line position shown in Fig. 4 to the dotted line position in said figure, thus providing means for holding the leaf-turning arm in positive engagement with the leaf until the latter is completely turned and then disengaging the arm from the leaf or the engaging member or clip carried thereby.

Figure 5:
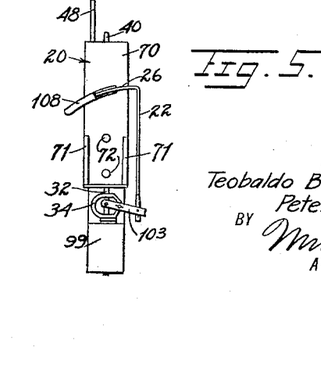
Fig. 5 is a front elevation of the casing containing the mechanism and showing the turning arm folded, the parts being shown on a reduced scale.
Figure 6:
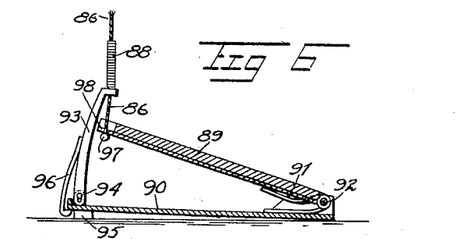
Fig. 6 is an enlarged detail sectional view of the foot treadle for operating the mechanism.

The positions of the parts when the leaf is turned and before the arm is depressed is clearly illustrated in Fig. 4 of the drawings in full lines, the spring 60 exerting tension at all times to hold the lever toward the pin 44, and as the bar is depressed said pin will be moved successively beneath the shoulders 63 and 64 while the lever moves to the right. In this manner the turning arm will be depressed twice in succession and upon releasing the pressure from the treadle the vertically shiftable members in the casing will be elevated under the action of their springs, that is, the bar, rod and plunger, so that the foot piece 49 will move upwardly on the spiral to rotate the turning arm while the presser foot serves to raise the ring and elevate the turning arm. This latter operation, however, is accomplished by two distinct movements owing to the fact that as the cross head is raised the pin 55 will engage the camming edge 65 to move the lever to the left and permit the pin 44 to pass from beneath the rounded shoulder 64 and engage beneath the shoulder 63, the rounding of the shoulder 64 permitting this movement so that the arm is slightly elevated as it approaches the central position with respect to its opposite limits. The arm will then be in the position shown in full lines in Fig. 3, and as the pressure is relieved from the treadle the cross head will assume its initial or natal position so that upon again being depressed it will swing the lever to the left to disengage the shoulder 63 from the pin 44 and permit the bar to elevate the turning arm as heretofore explained, in order to engage the clip 24. In this connection it is explained that depending upon the thickness of the book or folio the turning arm may be shifted vertically at any angular position to engage or disengage from the clip, owing to the fact that when the arm is turned and is met by resistance and then pressure is released upon the treadle, the cross head will move at its vertical limit upward and upon being depressed will release the bar in the same manner as heretofore described, whereas the arm will also be held against turning and the cross head depress the bar by engagement with the block 43. A pad or cushion 102 is fixed to the inner wall of the casing at the top so as to remove the impact due to the movement of the cross head 53 upwardly under the action of the spring 54 when pressure is released from upon the plunger 52 and avoid noise. In order to permit the turning mechanism to be folded compactly, the turning arm is made in two sections consisting of an inner or attaching section 103 which is slotted vertically to provide bifurcations 104 across which a pivot 105 extends, while the section 106 of the turning arm is depressed between the bifurcations of the section 103 and is longitudinally slotted, as shown at 107, to receive the pivot 105 therethrough and permit pivotal movement of the section 106 with respect to the section 103, whereby it may be swung upwardly in the manner shown in Fig. 5 of the drawings and engaged beneath a curved pocket or keeper 108 carried by the front of the casing 20 so as to house and protect the engaging end of the arm as well as to prevent injury to persons handling the device. The bight portion of the section 103 carries a stud 109 extending into the bifurcation to engage an aperture 110 at the inner end of the section 106 so that the latter section may be shifted inwardly to engage the stud 109 and hold the arm rigid while permitting outward movement of said section to be folded in the manner described.

Figure 9:
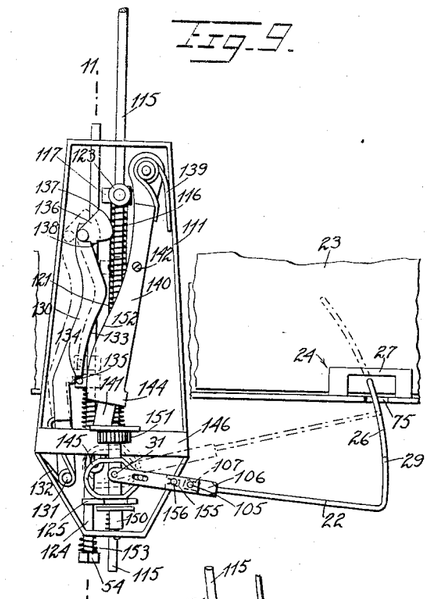
Fig. 9 is a view similar to Fig. 3 of a modified operating mechanism.
Figure 10:
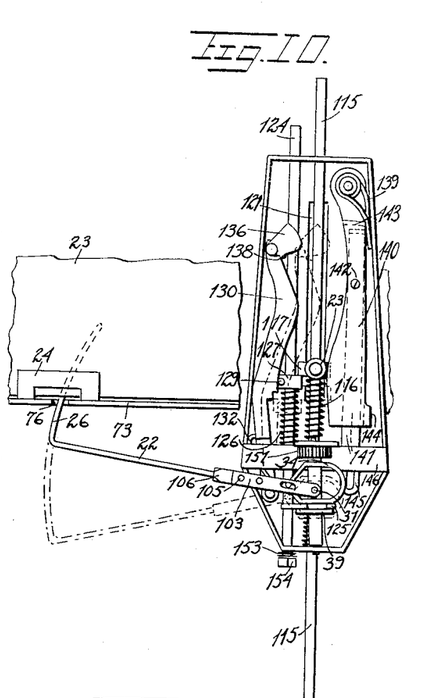
Fig. 10 is a similar view but showing the leaf-turning arm in an opposite position corresponding to the showing in Fig. 4.
Figure 11:
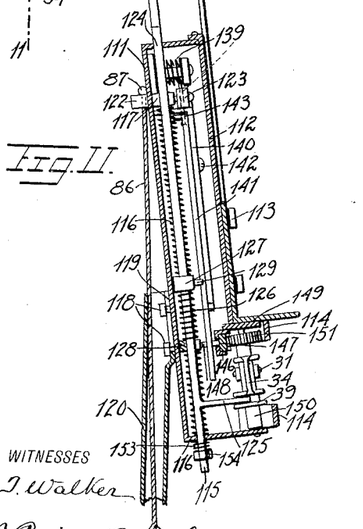
Fig. 11 is a vertical sectional view taken on the line 11—11 of Fig. 9.

In the form of the invention illustrated in Figs. 9 to 11, inclusive, the leaf-turning mechanism is slightly different and somewhat simplified and in lieu of turning the arm by means of a spiral, a rack and pinion are used so that the length of the casing may be reduced and the parts operate substantially as in the other form of the invention. As shown, the casing 111 which replaces the casing 20, is slightly tapered toward its upper end and considerably tapered at its lower end to best accommodate the mechanism, as well as for neatness and appearance, and the front of the casing, which is indicated by the numeral 112, is removably secured to the casing proper and is provided with a pair of studs 113 for engagement by the music rack as hereinbefore set forth. This casing front near its lower end is provided with an opening at the upper and lower ends of which outwardly arcuate or curved extensions 114 are provided to cover such mechanism as can be covered without interfering with the movement of the leaf-turning arm. Vertically slidable through the casing is a plunger 115 corresponding to the plunger 52 and this plunger is held normally upward by a coiled spring 116 mounted thereon between the bottom wall of the casing and a cross head 117 fixed to the plunger below the upper end of the latter, which projects through the top of the casing. The back of the casing is provided with a pair of vertically spaced headed studs 118 serving to removably engage a slot 119 in the upper end of a standard 120 of the tripod to removably support the mechanism, and the slotted portion of the standard is disposed at an angle so as to support the mechanism in a rearwardly inclined position for the same purpose as hereinbefore specified. Directly above the studs 118 the casing 111 is provided with a vertical slot 121 through which a vertically slotted extension 122 of the cross head 117, corresponding to the extension 85 of the cross head 53, projects to be engaged by a pull wire in the usual manner. A bearing roller 123 is rotatably supported on a forward extension of the cross head for shifting the turning arm, as will be later described. Also vertically slidable in the casing through its top and bottom walls is a bar 124 which carries a presser foot 125 at its lower end and which is normally held upwardly displaced by a coiled spring 126 mounted on the bar between the block 127 and a slotted bearing 128 projecting from the rear wall of the casing and receiving the bar therethrough for vertical sliding movement, while the block 127 is provided with a forwardly extending pin or projection 129. A lever 130 is provided at its lower end, as shown at 131, for lateral swinging movement in the casing and corresponding to the lever 58, said lever being held to the right by a spring 132 and having a camming edge 133 intermediate its ends and below which shoulders 134 and 135 are provided in the edge of the lever facing downward, the lower shoulder being preferably rounded for the purpose heretofore described. Pivoted to the upper end of the lever is a pawl 136 having a curved engaging edge 137 and provided with an inwardly extending lug 138 limiting the movement of the pawl downward against the lever. Pivoted to the upper right hand corner of the casing is a camming lever which is normally held to the left as by means of a spring 139, and this camming lever comprises an upper section 140 and a lower section 141 pivoted thereto, as shown at 142, and having an angular upper end 143 engaged by one end of the spring 139 so that the sections are moved to the left as one. The lower section, which is also the inner section, is held from movement to the right of the section 140 at its lower end by means of an inwardly extended or inturned portion 144, while its lower end projects beneath the section 140 and is provided with a vertical slot 145. Transversely mounted across the casing, preferably at its widest part, is an elongated guideway or casing 146 the same being preferably of rectangular cross section and slidably receiving a rack bar 147 for movement therein, limited in its movements in opposite directions by the side walls of the casing and having a rearwardly projecting pin or trunnion 148 which extends through the slot 145 in such a manner that when the camming lever is moved on its pivot the rack will be shifted while the slot compensates for the movement of the camming lever in the arc of a circle. The casing 146 carries a bearing plate 149 corresponding to the bottom wall of the casing 20 to form a bearing member together with an extension of the bottom wall of the casing rotatably supporting a vertical shaft or stem 150 constructed for engagement by the presser foot 125 and carrying a leaf-turning arm in the same manner as described in connection with the other form of the invention. In lieu of providing the stem 150 with a spiral for oscillating the turning arm horizontally, said part constituting a support for the arm, the stem carries a pinion 151 which is disposed in mesh with the rack bar at all times.

The operation of this form of the device is such that by exerting pull upon the wire, the plunger is moved downwardly so that the roller 123 will engage the camming edge 152 of the camming lever and more particularly of the section 140, so as to swing said lever to the right and move the turning arm from the dotted line position shown in Fig. 9 to the full line position shown in Fig. 10. Further movement of the plunger will cause the engagement of the cross head with the block 127 so as to move the pin 129 successively below the shoulders 134 and 135, the lever 130 moving under the action of its spring to the right to dispose the pin in the position named. In this manner the bar 124 will be depressed so as to dispose the ring 34 by engagement of the presser foot therewith and thus simultaneously disengage the turning arm from the clip of the music sheet. As pressure upon the treadle is released the spring 116 forces the plunger 115 upward and the roller, moving into the narrow portion of the camming lever, permits the latter to swing to the left under the action of its spring so as to shift the rack bar in the opposite direction and move the leaf-turning arm to the full line position shown in Fig. 9 of the drawings. Further depression upon the treadle after the roller has passed above the pawl 136, will engage the edge portion 137 of the latter after it has fallen by gravity, and the lever 130 will then be moved to the left to the dotted line position shown in Fig. 9 so as to release the pin 129 from beneath the shoulder 134. In this manner the bar is permitted to move upwardly to raise the arm to the dotted line position shown in Fig. 9 and the impact of the movement is taken up by a cushioning member or spring 153 mounted on the bar between the bottom of the casing and an enlargement in the form of a nut 154.

Figure 2:
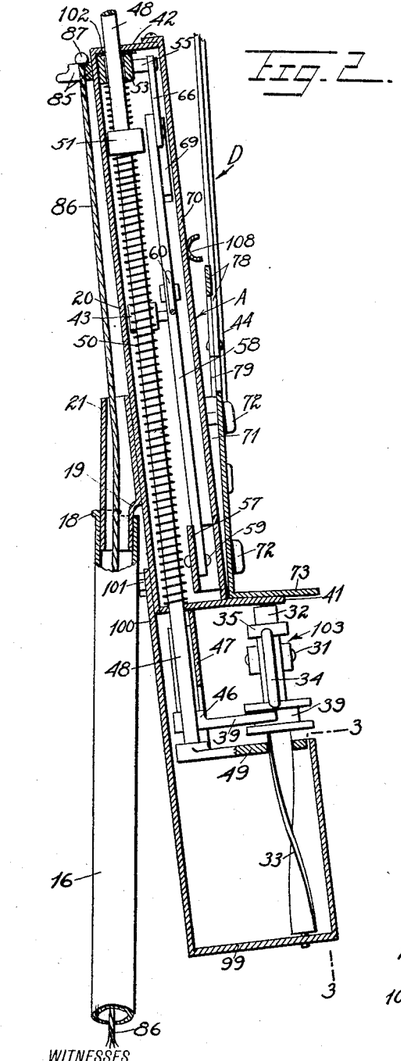
Fig. 2 is an enlarged vertical sectional view taken on the line 2—2 of Fig. 3.
Figures 2, 7, 14:
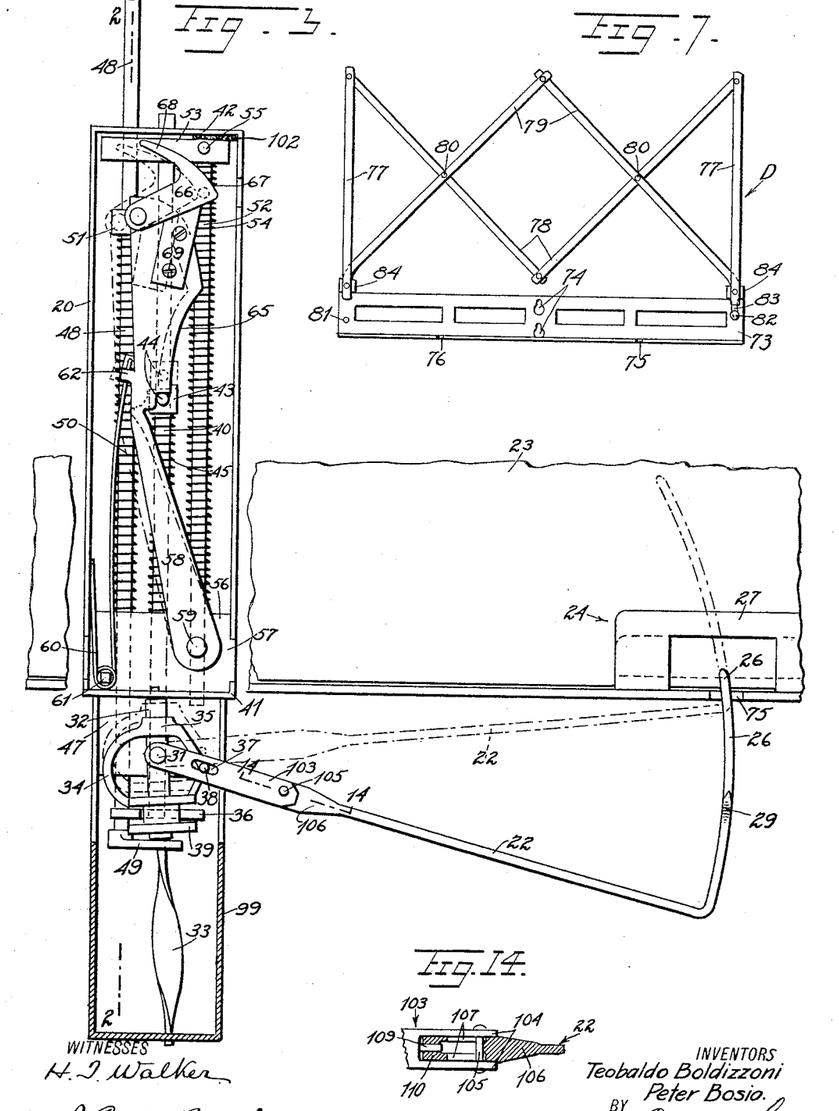
Fig. 7 is a front elevation of a music rack which coöperates with the casing to support the music book or folio the leaves of which are to be turned.
Fig. 14 is a detailed view of the manner of pivoting the turning arm to permit folding of the latter, the section being taken on the line 14—14 of Fig. 3.

In the form of the invention illustrated in Figs. 9 to 11, inclusive, the turning arm instead of being provided with an aperture 110 for engagement with the pin 109 is slotted at its inner end, as shown at 155, for engagement by a cross pin 156 disposed transversely of the bifurcation of the section 103 so as to hold the arm rigid when the section 106 is forced inwardly but to permit it to be folded when the section 106 is drawn outwardly so that the inner end of said section will clear the pin, as in the structure shown in Fig. 14.

It will thus be seen that we have provided a leaf-turning mechanism which, while particularly adapted as a music leaf turner, may be applied and used in connection with any form of book or folio so that a single arm will positively engage and turn a leaf having suitable clips or engaging members such as described, the arm moving or oscillating in the same horizontal plane when turning a leaf and moving upwardly to engage the leaf when returned in a plane slightly higher than that taken in the turning direction or into which the arm is moved after being disengaged beneath the leaves or sheets so as to be disposed in contact with the next succeeding leaf and in position to engage the clip when elevated.

In the last described form of the invention the camming arm is made in two sections so that the arm will operate to engage with and disengage from the clips at different angular positions to accommodate books or folios of different thicknesses, the sections forming a break-joint so that the sections will move on the pivot 142 when the arm meets with resistance and is being raised or lowered. By moving the arm in the same horizontal plane the possibility of the leaf being released before it is completely turned is obviated, and in either form of the invention before the pins 44 and 129 are engaged above the respective shoulders after the arm is turned to the left, the sheet may be turned to its normal position by releasing the pressure upon the treadle to permit upward movement of the plunger and return swinging movement of the arm in the same horizontal plane. The shaft or stem 150 is slightly inclined forwardly as shown in Fig. 11 of the drawings so that as provided for by the inclination of the rack in Fig. 2, the leaf-turning arm will be gradually raised as it approaches the intermediate position when turning or returning a leaf, so as to prevent the disengagement of the arm from the leaves.

Having thus described our invention, what we claim as new and desire to secure by Letters Patent is:—

1. In a device for turning the leaves of a music book, said leaves having engaging members, a turning arm adapted for oscillation in a horizontal plane, means for oscillating the arm, means for disposing the arm for engagement with said members of the leaves to be turned and causing the upward movement thereof to engage said members, said means permitting the movement of the arm downwardly to release the leaves after the latter are turned, means for returning the arm to its initial position, and means automatically operated during the returning of the arm for slightly elevating the arm from its position after having moved downwardly to release the leaves whereby said arm will contact with the leaf when it is returned to its initial position.

2. A music leaf turner including a horizontally oscillating support, a leaf turning arm horizontally pivoted to the support, means for oscillating the support, means for moving the arm vertically in one direction when the support is turned in one direction and causing the arm to be turned in the same horizontal plane in the opposite direction, means coöperating with the last named means to permit the arm to be moved vertically in the opposite direction at the completion of the last-named turning movement of the support, and means coöperative with the second named means and operative upon the return of the arm to cause the arm to be moved slightly in the first-named vertical direction to properly engage the leaves to be turned.

3. In a music leaf turner, the combination of a casing, means mounted in the casing and arranged for turning movement, a leaf turning arm pivoted for vertical movement to move with said means, means for turning the first-named means, means operated by said first-named means for moving the leaf-turning arm on its pivot when the same is moved in one direction, and means to disengage the leaf turning arm when the same is moved into the last named position, said turning means being operated by a vertical force.

4. A music leaf turning device for books comprising in combination, engaging members carrier by the leaves of the book, said engaging members embodying apertured sections of material rebent to provide front connecting portions, a leaf turning mechanism including a leaf turning arm adapted to engage beneath said connecting portions when said engaging members are applied to the leaves, and means for turning the arm and directing it beneath said connecting portions of the leaves successively.

5. A leaf turner comprising engaging members carried by the leaves, said engaging members embodying apertured sections of material rebent to provide front connecting portions, a leaf turning mechanism including a leaf turning arm, said arm having an upwardly directed engaging portion with a finger branching therefrom below its upper end, the engaging portion being adapted to extend beneath said connecting portions and between the same and the leaves to be turned while the finger is adapted to engage outwardly of the connecting portion to prevent displacement of the leaves when turned, and means for turning the arm to move the latter into and out of engagement from said members carried by the leaves.

6. A music leaf turner, including a horizontally turnable support, a leaf turning arm horizontally pivoted to the support, means for turning the arm when engaged with the leaves and in the same horizontal plane whereby accidental releasing of the leaves is prevented, means for moving the leaf turning arm vertically to engage and disengage a leaf and means coöperative with the last named means to cause the automatic partial elevation of the turning arm when moved to engage with the leaves.

7. A music leaf turner, including a horizontally turnable support, a leaf turning arm horizontally pivoted to the support, means for turning the arm when engaged with the leaves and in the same horizontal plane whereby accidental releasing of the leaves is prevented, said leaves being adapted for engagement by the arm, means for moving the arm vertically upward for engaging the leaves before the latter are turned, and means for moving the arm vertically downward after the leaves have been turned to disengage the same, said means permitting the return of the arm and leaf without moving the arm downward and also permitting slight elevation thereof prior to the engagement of the arm with the leaves for turning the same.

8. A music leaf turner, including a horizontally turnable support, a leaf turning arm horizontally pivoted to the support, means for turning the arm when engaged with the leaves and in the same horizontal plane whereby accidental releasing of the leaves is prevented, said leaves being adapted for engagement by the arm, means for moving the arm upward during the swinging thereof for disposing the same in position to engage the leaves before the latter are turned, and means for moving the arm downward after the leaves have been turned to disengage the same, said arm moving in the same horizontal plane when turning the leaves and adapted to be returned in the same plane for moving the leaves to their initial positions without releasing the same.

9. A music leaf turner, including a horizontally turnable support, a leaf turning arm horizontally pivoted to the support, means for turning the arm when engaged with the leaves and in the same horizontal plane whereby accidental releasing of the leaves is prevented, said leaves being adapted for engagement by the arm, means for moving the arm upward for engaging the leaves before the latter are turned, means for moving the arm downward after the leaves have been turned to disengage the same, said arm moving in the same horizontal plane when turning the leaves and adapted to be returned in the same plane for moving the leaves to their initial positions, and means for slightly raising the arm during its return for proper engagement with the leaves before being raised as first mentioned.

10. A music leaf turner, comprising an oscillatory support, means for oscillating the support, a normally depressed leaf turning arm horizontally pivoted to the support, means for moving the arm vertically to engage a leaf to be turned while the arm remains or swings in the same horizontal plane, means for disengaging or depressing the arm from the leaf, and means oscillated with the arm swinging means to return the arm in a horizontal plane below the leaves or aforesaid plane.

11. A music leaf turner, comprising an oscillatory support, means for oscillating the support, a normally depressed leaf turning arm horizontally pivoted to the support, means for moving the arm vertically to engage a leaf to be turned while the arm remains or swings in the same horizontal plane, means to return the arm in said plane for returning the leaf, and means oscillated with the arm swinging means to return the arm in a horizontal plane below the leaves or aforesaid plane independent of the leaf turned to engage a new leaf.

In testimony whereof we, TEOBALDO BOLDIZZONI and PETER BOSIO, have signed our names to this specification in the presence of two subscribing witnesses.

TEOBALDO BOLDIZZONI.
PETER BOSIO.

Witnesses:
JOHN E. BURCH,
PHILIP D. ROLLHAUS.